United States Patent [19]

Greene

[11] 4,125,780
[45] Nov. 14, 1978

[54] MULTIPLE FLUID EXPANSION ENERGY EXTRACTION METHOD AND APPARATUS

[76] Inventor: Clarence K. Greene, 100 N. Arlington Ave., Reno, Nev. 89501

[21] Appl. No.: 574,539

[22] Filed: May 27, 1975

[51] Int. Cl.² ............................................. F01D 15/10
[52] U.S. Cl. .................................... 290/4 A; 290/52; 60/715
[58] Field of Search .................... 60/715; 290/52, 4 A

[56] References Cited

U.S. PATENT DOCUMENTS

| 1,865,909 | 7/1932 | Hinchcliffe | 60/715 |
| 2,045,322 | 6/1936 | Cook | 60/715 |

FOREIGN PATENT DOCUMENTS

| 601,541 | 8/1934 | Fed. Rep. of Germany | 60/715 |
| 703,504 | 2/1941 | Fed. Rep. of Germany | 60/715 |
| 79,097 | 3/1919 | Switzerland | 60/715 |
| 367,626 | 2/1932 | United Kingdom | 60/715 |

Primary Examiner—Gerald P. Tolin
Attorney, Agent, or Firm—Herbert C. Schulze

[57] ABSTRACT

This is a method, and an apparatus for performing said method, wherein the latent energy in expansible fluids is converted to mechanical or electrical energy or the like by the utilization of a multiplicity of expanders wherein succeeding expanders derive energy from fluid emanating from a preceding expander from which energy was previously derived; and, wherein, a feature is the by-passing, as desired, of subsequent expansions so that maximum torque can be obtained when desired; and wherein, the mechanical outputs of the expanders are connected by differential energy distributing means so as to accommodate for changes in the relative capacities of the two expanders by reason of changes in conditions in such manner that the relative change of capacities are accommodated by relative changes in the speed of the mechanical output of the expanders.

11 Claims, 5 Drawing Figures

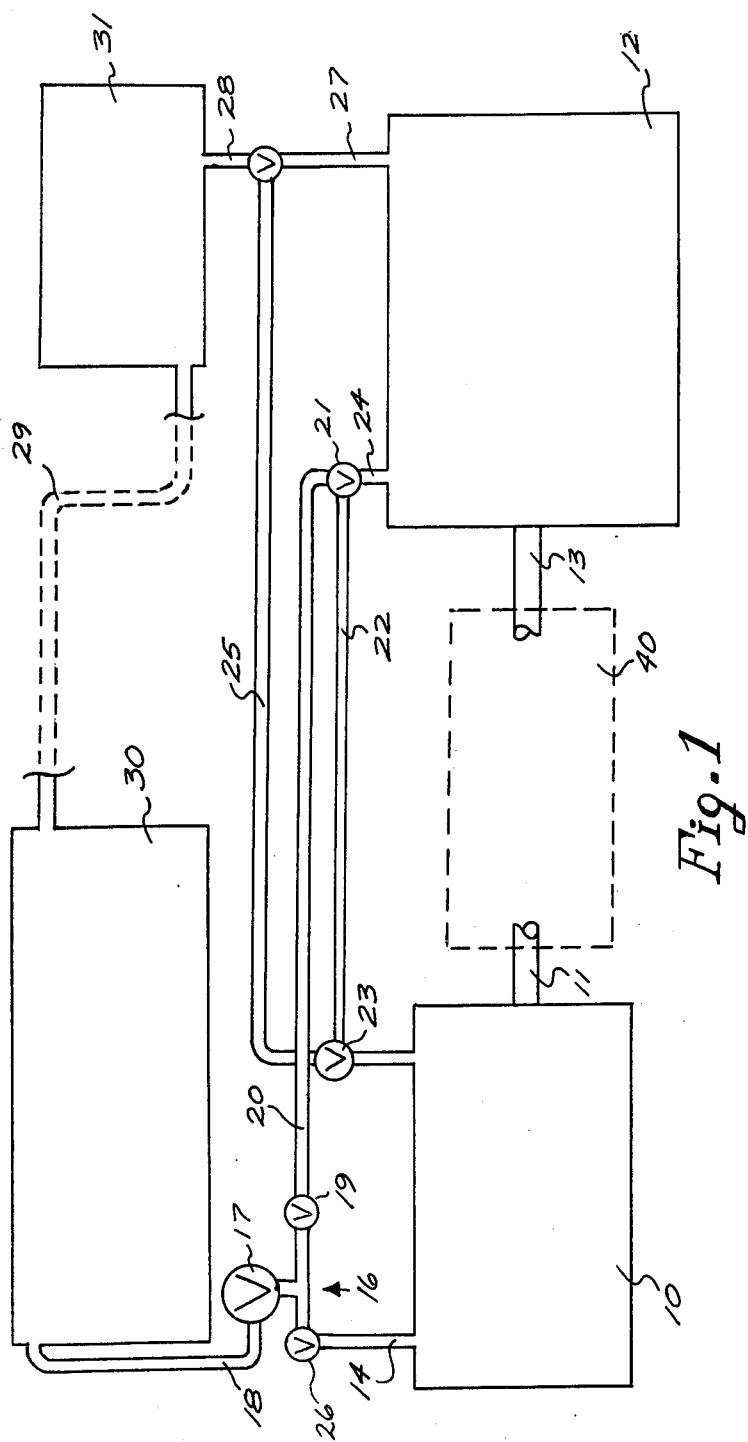
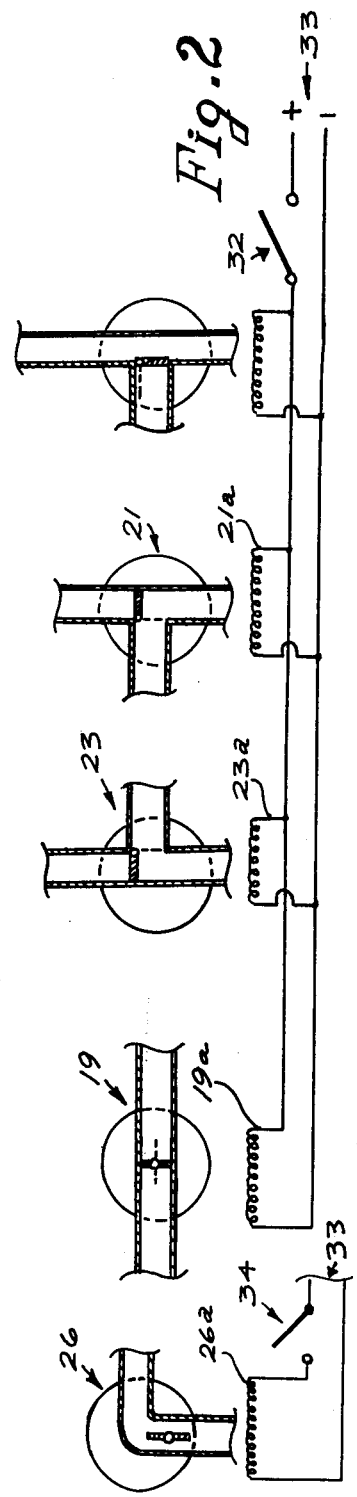

MULTIPLE FLUID EXPANSION ENERGY EXTRACTION METHOD AND APPARATUS

CROSS-REFERENCE TO RELATED PATENT APPLICATIONS

This application is related to my application for "Momentary Torque Maximizing Method and Apparatus" filed concurrently herewith.

BACKGROUND OF THE INVENTION

1. Field of the Invention

This invention is in the general field of methods and devices for extracting energy from fluids which are expansible, such as steam, hot brines, and the like. The invention is more particularly directed to a method and apparatus by which the fluid is passed, successively, through successive expanders in such manner that one expander removes a portion of the latent energy of the fluid and the next expander removes a successive portion of the energy so as to achieve full utilization of the energy available. The invention is even more particularly directed to a method and means for distributing the load and accommodating for change of capacities due to load and input variations by differential means wherein the increased speed of one expander is compensated for by a decreased speed of another expander so as to work at peak effeciency under the varying conditions of capacity and load.

2. Description of the Prior Art

There have been many attempts at providing successive expansions of working fluids utilizing the principle of extracting latent energy from an expansible fluid, such as double expansion steam engines, and the like. In general certain fixed relationships are involved and the successive expansion arrangements do not necessarily always utilize fully the available energy due to improper balancing of the distribution of power and load. It is inherent in such systems that the multiple expanders are connected to a common shaft in such manner that there is only one fixed condition of input and load during which the successive expanders work most efficiently. In the present invention, due to a differential mechanical coupling of the mechanical output of the expanders, changed input and load conditions are accommodated without loss of efficiency. In this area there is not prior art.

SUMMARY OF THE INVENTION

In the present atmosphere of world-wide concern over energy, it has become increasingly important to maximize the use of energy and, particularly, to provide effective means for utilizing such energy as the energy available in hot fluids (such as hot brines beneath the surface of the earth) and steam systems and the like. I have been studying and working in this field for some period of time and have been disturbed by the present inability to achieve maximum utilization of the latent energy in such fluids as hot brines and the like as well as being concerned with the inability in such systems as exist to provide for maximum bursts of power as may be required because of unusual load conditions.

The function of feeding steam or hot brines or the like into expanders which convert the latent energy therein into mechanical or electrical energy is well known. It is also known that, under proper circumstances, steam or the like can be utilized in a primary expander and the exhaust can be utilized in a secondary expander, and so on. In such systems as exist, however, problems of balancing of loads with input and output due to fluctuations between successive expanders have been severe. Additionally, there is always the problem of the utilization of the full maximum surges of energy available at times of peak load requirements or the like.

In my investigation, I have conceived a unique and improved method for the multiple utilization of expanders wherein the input to the output load is constantly balanced in order to achieve full power from each of the expanders and without having any loss resulting from malfunction or variable fluctuations in various expanders.

I have accomplished the end desired by means of a new, unique, and improved method and apparatus wherein the original expansible fluid is passed to a primary expander and in which the output from the expander is differentially connected to the output of a second expander — which second expander is so adapted as to receive either the exhaust from the first expander or, for moments of maximum load, the primary input, along with, or independent of, the primary expander.

Naturally, I recognize that there have been double and triple expanders and the like in the past. It has been well known in some railroad applications and other applications to provide two or more expansion zones coupled and ducted in such manner that after expansion in one expander the fluid is again additionally expanded in the next expander. In the past, all of these expanders have had a common fault in that they are so arranged and so coupled that they were designed to operate at one point of volume and pressure of input, and one point of output load. Otherwise, maximum efficiency is not obtained. When the input or output is altered from the one optimum position, a condition will be found to exist which finds the two expanders working at different output torque and/or speed such that with their common output and fixed input relationship the two or more expanders may be "fighting" each other to a certain extent. In my case, however, the conditions can change as will become apparent upon studying the description of the preferred embodiment which follows, such that even though there may be variations in the output load or input pressures and volumes, that nonetheless all of the expanders will be working so as to extract energy from all of them which energy is combined through the use of the unique connections utilized so as to work together regardless of these differentials and not be dependent upon one optimum condition. Thus, the expanders in my system will each run at whatever speed is necessary to as to use the available steam or other fluid in the expansion ratio necessary to utilize the maximum energy from such fluids.

In my invention, a method is disclosed for differentially coupling a pair of compounded expanders (i.e., the exhaust of one expander is ducted to the intake of a succeeding expander) to a common load in such a manner that the following results: (1) An increase in speed of one expander causes a corresponding decrease in the speed of the second expander; (2) the individual torques of the expanders maintain the fixed ratio of one to the other; (3) the arithmetical sum of the torques of the expanders is equal to the torque demand of the load.

In the illustrations and preferred embodiments described. three different means are shown for effectuating the method desired. These will be summarized here and will be covered in more detail in the description of the preferred embodiment.

In one arrangement, the mechanical output shaft of the compounded expanders are drivingly connected to a pair of co-axial gears meshing with a second set of gears, said second set of gears being journaled on a carrier for free rotation of their own axis, said carrier being fixed to a output shaft of co-axial with the first named pair of drive gears and said output shaft being mounted for rotation independent of the foresaid first pair of gears.

In a second means, the mechanical output shaft of the compounded expanders are drivingly connected to independently rotatable armatures of direct current generators, which generators are electrically connected in parallel with the combined electrical output connected to a common electrical load. The field current of the generators is independent of the load current, so that an increase in the rotational speed of one armature will cause a proportionate increase in the voltage output of that armature, causing an increase in current flowing through the two armatures in the common load and a resultant increase in the torque demand of the other armature.

In the third apparatus shown for effectuating the method of this invention, the output shafts of the compounded expanders are individually connected to individual hydraulic pumps, each of said pumps discharging into a manifold supply line connected to the input of an hydraulic motor. The hydraulic motor becomes the common load of the compounded expanders and its outlet is ducted to the intakes of the hydraulic pumps. An increase in the speed of one of the compounded expanders will increase the output of its pump, thereby increasing the hydro-static pressure in the hydraulic motor supply line and increasing the torque demand on the other expander causing a reduction in speed. If the expander which has been slowed is the primary exander, it will meter less fluid into the duct connecting its outlet with the intake of the secondary expander, thereby slowing the secondary expander by reason of the decreased pressure in the duct connecting the inlet of the secondary expander to the exhaust of the primary expander. The decrease in pressure in the connecting duct will reduce the torque output of the secondary expander and increase the torque of the primary expander until the two torques are in balance.

The method of this invention overcomes the difficulty inherent in compounded engines in the past, namely the inability of the two expanders to adjust their relative capacities so as to accommodate the varying load requirements.

It is an object of this invention to provide a method and means for utilizing an expansible fluid for the extraction of latent energy therefrom and conversion into mechanical or electrical energy or the like wherein multiple stages of expansion of said fluid are utilized and in which the output from the expanders is differentially coupled.

Another object of this invention is to provide such a method and apparatus as previously mentioned; wherein, for momentary periods, more than one expander can receive the direct input of fluid from the primary source for maximum torque output.

It is another object of this invention differentially couple a pair of compounded expanders to a common load, in such manner an increase in speed of one expander causes a corresponding decrease in the speed of the other; the individual torques of each expander maintain a fixed ratio to one another; and the arithmetic sum of the two expander torques is equal to the torque demand of the load.

The foregoing and other objects and advantages will be clear to those skilled in the art upon reading the description of a preferred embodiment which follows in conjunction with the appended drawings.

BRIEF DESCRIPTION OF THE DRAWINGS

FIG. 1 is a schematic block diagram of a preferred apparatus for practicing the method of this invention;

FIG. 2 is a schematic diagram illustrating valving which may be used in the embodiment of FIG. 1;

DESCRIPTION OF A PREFERRED EMBODIMENT

Figure 3:
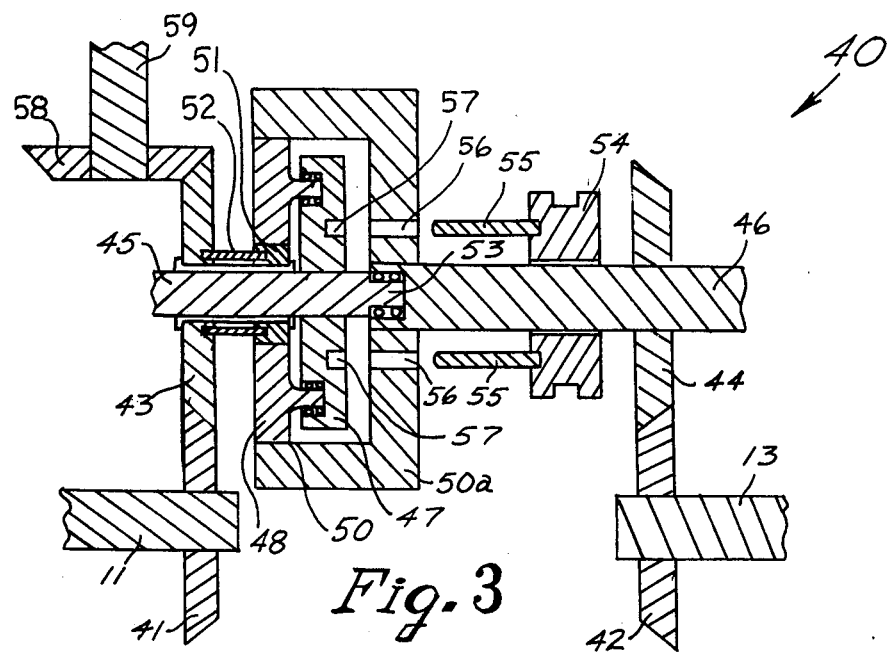
FIG. 3 is a schematic, partially sectioned, view of a differential mechanism to balance the output of the two expanders of FIG. 1.

Attention should be first directed to FIG. 1 wherein there is a block schematic diagram of a preferred embodiment of an apparatus to practice the method of this invention. A source of fluid containing latent energy is indicated at the block 30 and is shown to be connected through piping 18, through control valve 17, through shutoff valve 26, in piping 14, into the intake of an expander 10. Expander 10 will be referred to as the primary expander. It will further be noted that the exhaust 15 from the primary expander enters a valve 23 from which it may be interconnected either to the intake 24 of secondary expander 12 or may be interconnected to the exhaust 27 from the secondary expander.

Likewise, it will be noted that through the tee-connection 16, the primary fluid source may be interconnected through valve 19 direct to the intake 24 through the piping 20.

It will be noted that the exhaust through piping 25 and/or piping 27 through interconnecting piping 28 may pass to a condenser or the like 31 which will then be interconnected by piping 29 to the primary source 30 which might be a boiler or the like. It should be understood that 31 might also merely illustrate ultimate disposition such as return through a conduit to a brine source beneath the surface of the earth or the like. Also the primary source 30 may be such a source as hot brine beneath the surface of the earth.

The primary expander 10 has an output illustrated by an output shaft 11 and the secondary expander 12 has an output illustrated by the output shaft 13. The outputs are interconnected at 40 by means as will be further illustrated in FIGS. 3, 4, and 5 so as to balance the load between them. It will be particularly noted that in the illustration of FIG. 1 the secondary expander 12 is shown to be larger in size than the primary expander 10. It is understood that such a condition normally will exist due to the expansion of the fluid through primary expander 10 causing a larger volume of fluid to be available to secondary expander 12. It should be further understood that while two expanders have been shown it is recognized that additional expanders could be utilized in a like manner and it is not intended to limit this method to two expanders.

FIG. 2 illustrates schematicaly the position of the valving shown in FIG. 1, and in particular shows the interrelationship of the three valves 19, 23 and 26. 26 is controlled by solenoid or the like 26a activated by a switch 34 and utilizing a power source 33, by means which are well known to those skilled in the art. Valves 19 and 23 are activated by their respective coils 19a and 23a and operate through a single switch 32 which can be powered by the same power source as 33. The details of solenoid valves and the like are well known to those skilled in the art, and in fact the valves need not be solenoid valves but could be hydraulically operated valves, could be manually operated valves, or the like. It is to be particularly noted however that each valve has two positions, one shown by the solid lines in the FIG. 2 illustration and the other alternate position shown by the dotted lines. It is to be observed that valve 26 may operate independently but valves 19 and 23 will act together. Thus when the valve 19 closes the line 20 as is illustrated, the valve 23 will have closed the line 25 and when the valve 19 has opened the line 20, the valve 23 will have opened the line 25 and closed the line 22.

It is quite clear that during operation, then, both expanders may, if desired, receive the direct live fluid from the primary source of fluid, or either expander may receive the same independently, or the first expander may receive the same and pass it on to the second expander for further utilization of remaining latent energy.

A control valve 17 is illustrated which control valve can control the overall amount of fluid entering the system.

FIG. 3 illustrates one arrangement which might be placed within the output block 40 of FIG. 1. It is noted that the input shafts 11 and 13 from the primary and secondary expanders respectively are shown. Shafts 11 and 13 are connected to gears 41 and 42 respectively which in turn mesh with gears 43 and 44.

The gear 43 it will be noted is journaled upon shaft 45. Shaft 45 also has journaled thereon sun gear 51 which is fastened with appropriate pins or the like 52 to gear 43. Planet gears 48 and 49 are enmeshed with sun gear 51 and are carried by carrier plate 47 which is fixed to shaft 45.

Planet gears 48 and 49 are enmeshed at point 50 with internal teeth on the gear 50a. The shaft 45 is shown to be journaled merely for pilot position at reduced area 53 in the end of shaft 46. A pair of holes 56 has been provided through the gear 50a and a pair of holes 57 matching are provided in the carrier plate as indicated. The pins 55 carried by collar 54 which is slidably mounted on shaft 46 are capable of being inserted through holes 56 and into holes 57 so as to lock this differential mechanism in one position as desired. The collar 54 would normally be actuated by a yoke or the like as is known in the art.

Gear 40 is fixed to shaft 46 as is gear 58.

The gear 58 meshes with gear 43 and provides output to shaft 59 as indicated.

By the mechanism as shown in FIG. 3 the load between the expanders may be balanced, or the two may be locked together as desired by the yoke and pin arrangement as previously described. The differential motion and the balancing of the load will be clear to those skilled in the art through the gearing as indicated.

Figure 4:
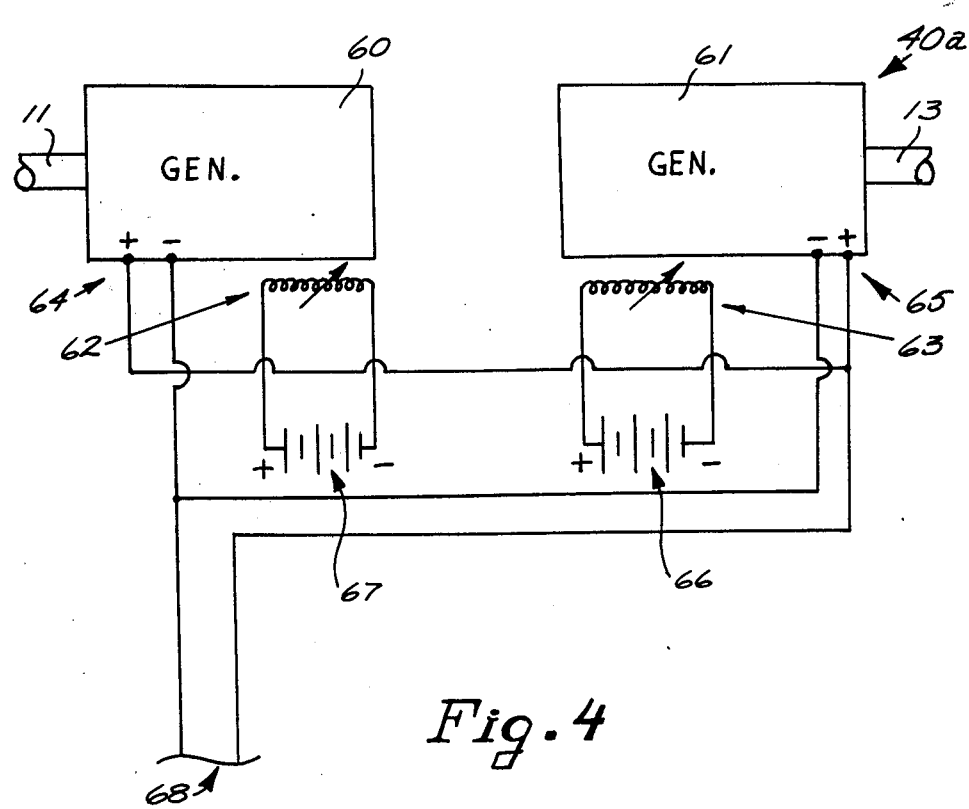
FIG. 4 is a schematic block diagram of an alternate means to balance the output of the two expanders of FIG. 1; and, FIG. 5 is a schematic block diagram of another alternate means to balance the output of the two expanders of FIG. 1.

FIG. 4 shows another method of distributing the load between the two expanders so that they do not work against one another and do work in unison. In this case it is noted that shaft 11 and 13 respectively are connected to generators 60 and 61. The generators 60 and 61 each have fields of 62 and 63 respectively and armatures 64 and 65 respectively as is known in the art. The fields 62 and 63 however, are separately excited, as by batteries or the like 67 and 66, and thus the differences, if any, between the generation of current is balanced and is taken out as load current at 68.

Figure 5:
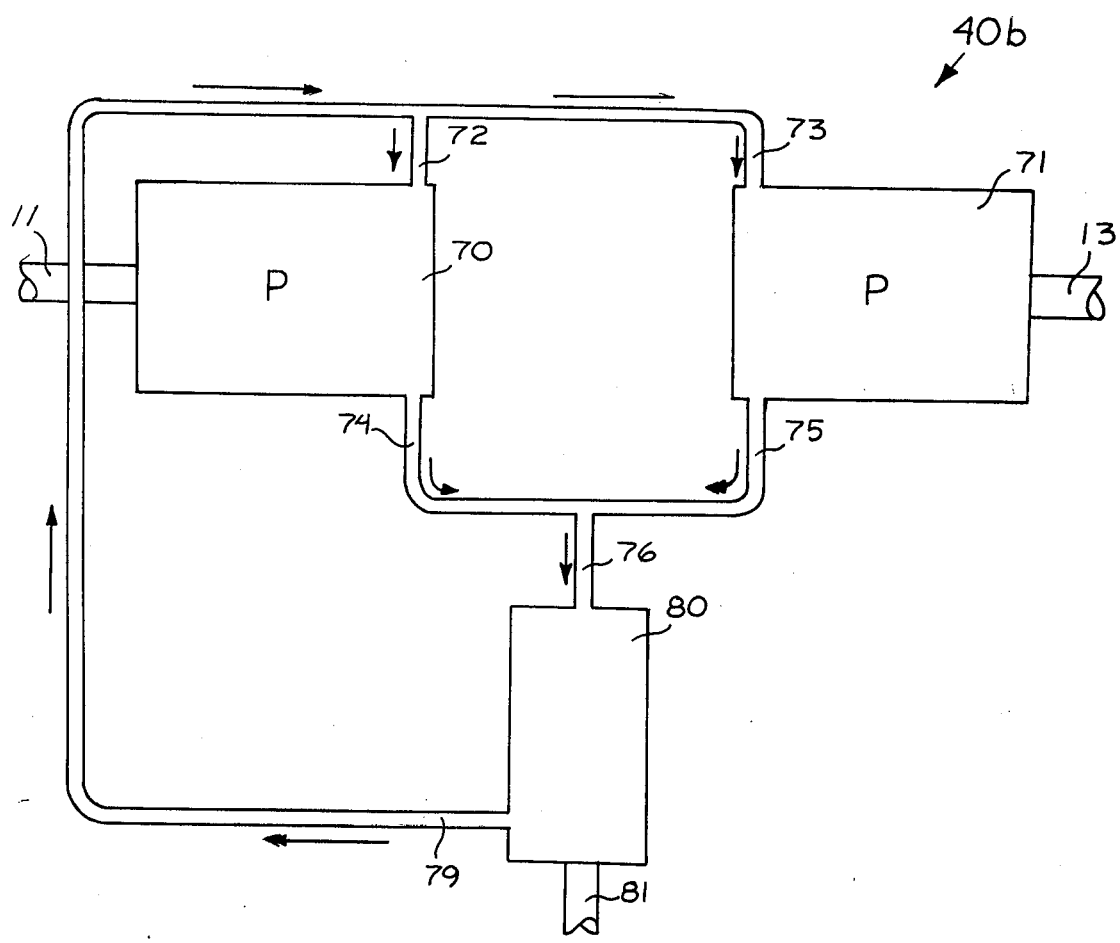

FIG. 5 shows another way of balancing the load wherein the input shaft 11 and 13 are connected to hydraulic pumps 70 and 71. The pumps exhaust fluids pass through lines 74 and 75 which are jointly fed into line 76, being the intake of hydraulic motor 80. Check valves 78 and 77 are provided as indicated so as to avoid any back pressure in the event one of the units should fail, or the like.

Return from the hydraulic motor passes through line 79 and is divided through lines 72 and 73 into the two pumps.

The shaft 81 of the hydraulic motor provides the ultimate load. It will be clear to those skilled in the art, that differentials in the input load of shafts 11 and 13 will be compensated for through this hydraulic arrangement and the ultimate load will properly be the combined output of the two expanders.

By the arrangement described, I have provided a series of expanders in which the fluid to the expanders is in series, but the output of the expanders is in parallel.

While the embodiments of this invention shown and described are fully capable of achieving the objects and advantages desired, it should be clear that these embodiments have been shown for purposes of illustration only, and not for purposes of limitation.

I claim:

1. The method for utilizing the latent energy of an expansible fluid comprising: (1) introducing an expansible fluid in its primary condition into a first expander; (2) removing the fluid from the said first expander after expansion therein; (3) introducing the fluid so removed from the first expander into a second expander; (4) removing the fluid from the said second expander after further expansion therein; (5) coupling the output of each of said expanders together in a differential manner; and (6) utilizing the combined output through the differential coupling for a single combined power output.

2. The method of claim 1 wherein the expansible fluid is steam and wherein the exhaust from the second expander is carried to a condenser thence back to a steam generator for recycling.

3. The method of claim 1 wherein the expansible fluid in its primary condition is alternately introduced into the second expander and during such time the fluid removed from the first expander is diverted from the second expander.

4. Apparatus for utilizing the latent energy of an expansible fluid comprising: (1) a source of expansible fluid; (2) a primary expander suitable to utilize the expansible fluids; (3) means to introduce said expansible fluids into said primary expander; (4) means to remove expanded fluids from said first expander; (5) a secondary expander; (6) means to introduce said expanded fluid from primary expander into secondary expander; (7) means to remove the fluid from the said secondary expander; (8) means to transmit power from primary expander; (9) means to transmit power from said secondary expander; (10) means coupling the means to transmit power from said primary expander and said secondary expander. including differential means; and,

(11) means to derive a single mechanical power output from said differential coupling means.

5. The apparatus of claim 4 in which the said differential coupling means comprises a mechanically geared differential means.

6. The apparatus of claim 4 wherein the differential coupling means includes two hydraulic pumps and in which said two hydraulic pumps jointly activate a single hydraulic motor.

7. The apparatus of claim 4 wherein the differential coupling means comprises two electrical generators so connected as to generate electricity and transmit the same through a common transmission line.

8. The apparatus of claim 7 wherein independent means are provided to excite the fields of the two generators.

9. The method of coupling two or more expanders to an external load in such a manner that the torque delivered by the first expander bears a constant ratio to the individual torques delivered by successive expanders including: (1) connecting a source of expansible fluid to the intake of a first expander; (2) connecting the exhaust of said first expander to the intake of a second, and larger expander; (3) connecting the exhaust of the second expander to a disposition zone; (4) connecting the power output of the first expander to one element of a differential means; (5) connecting the power output of the second expander to a second element of said differential means; (6) connecting a third element of said differential means to a load.

10. The method of claim 9 in which the exhaust of said second expander is connected to the intake of a third expander.

11. The method of claim 1 wherein the ratio of torque output of the said expanders is varied by means of a differential coupling.

* * * * *